United States Patent [19]
Shiozaki et al.

[11] Patent Number: 5,680,121
[45] Date of Patent: Oct. 21, 1997

[54] DIRECTION DISPLAY DEVICE

[76] Inventors: Hiromitsu Shiozaki, 2-5-20 Minamiushikawa, Toyohashi-city, Aichi-pref.; Tatsuo Fukaya, 4-179-2 Momoyama-cho, Oobu-city, Aichi-pref., both of Japan

[21] Appl. No.: 501,236

[22] Filed: Jul. 12, 1995

[30] Foreign Application Priority Data

Jul. 14, 1994 [JP] Japan .................. 6-186232
Apr. 28, 1995 [JP] Japan .................. 7-105652

[51] Int. Cl.$^6$ .................................. B60Q 7/00
[52] U.S. Cl. .................. 340/908.1; 340/485; 116/63 P; 40/614
[58] Field of Search ........................... 340/481, 484, 340/485, 486, 908.1, 908; 116/63 R, 63 P, 28 R; 40/612, 614, 570

[56] References Cited

U.S. PATENT DOCUMENTS

| | | | |
|---|---|---|---|
| 2,433,252 | 12/1947 | Zull | 340/485 |
| 2,500,106 | 3/1950 | Wehr | 40/614 |
| 2,903,688 | 9/1959 | Sorensen | 340/908.1 |
| 3,381,399 | 5/1968 | Drueck | 340/473 |
| 3,430,373 | 3/1969 | Shaffer | 40/614 |

OTHER PUBLICATIONS

Product Leaflet "Route Change Guidance Mark," of Taiyo Sangyo Co., Ltd. (Tatsuo Fukaya); 5 pages; undated.

*Primary Examiner*—Jeffery Hofsass
*Assistant Examiner*—Anh La
*Attorney, Agent, or Firm*—Burns, Doane, Swecker & Mathis, LLP

[57] ABSTRACT

In a direction display device which indicates direction by an arrow, a translucent direction display portion is formed on an outside housing. A rotation roller is disposed within the housing to be rotated by a motor. Inclined stripes are formed on the rotation roller, and therefore, by the drive force of the motor, the rotation roller rotates in the housing. As a result, the inclined stripes on the rotation roller move in the direction display portion of the housing as if the stripes move in the same direction as the arrow direction. By indicating a direction by the arrow of the direction display portion and the direction of a movement direction of the inclined stripes of the rotation roller, visibility of the indicated direction is increased. In the case that the display device has two arrow portions, the arrow portions to be used is reversed from one to the other and the direction of movement of the inclined stripes is reversed also.

14 Claims, 15 Drawing Sheets

DIRECTION DISPLAY DEVICE

CROSS REFERENCE TO RELATED APPLICATIONS

This application is based on and claims priorities of Japanese Patent Applications No. 6-186232 filed Jul. 14, 1994 and No. 7-105652 filed Apr. 28, 1995, the contents of which are incorporated herein by reference.

BACKGROUND OF THE INVENTION

1. Field of the Invention

The present invention relates to a direction display device which can be used, for example, for guiding vehicles on a road.

2. Description of Related Art

Conventionally, in direction display devices used for indicating a moving direction for vehicles on a road, a simple arrow display or an arrow display emitted by electric bulbs are known.

However, using the arrow display only, an indicated direction cannot be seen clearly. That is, even though an arrow portion of the arrow display is emitted, a vehicle driver can recognize only that a longitudinal object is displayed. Therefore, the arrow direction indicated by the display device cannot be immediately recognized until the vehicle approaches the display device.

SUMMARY OF THE INVENTION

It is a purpose of the invention to provide a direction display device in which an arrow indicating a direction is easily seen.

According to the present invention, a direction display portion made of a transparent portion is formed in at least one portion of a housing and a rotation member is disposed so as to rotate freely in the housing. Inclined stripes are provided on the rotation member and an electric motor rotating the rotation member is installed. A light emitter may be provided in the housing if needed so that light of the light emitter may be permeated toward an outside of the housing from the direction display portion.

Since the rotation member formed with inclined stripes in the direction display portion rotates, the stripes look as if they move in the same direction as indicated by the display portion. Therefore, a direction indicated by the direction display portion can be seen clearly because of the movement of the stripes. Further, by providing the light emitter, since the direction display portion in the housing stands out by the emitted light, the indicated direction of the direction display portion can be recognized better.

DETAILED DESCRIPTION OF THE PREFERRED EMBODIMENTS

The present invention will be described in detail with reference to the accompanying drawings.

(First Embodiment)

Figure 1:
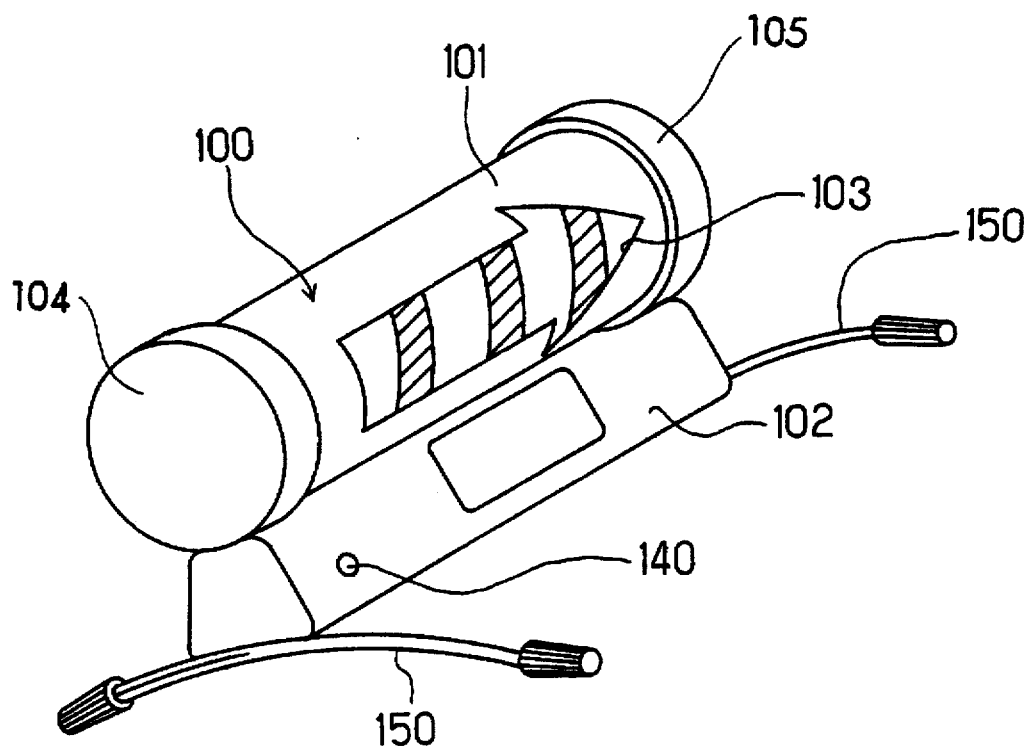
FIG. 1 is a perspective view illustrating a direction display device according to a first embodiment of the present invention.

In FIG. 1 illustrating a first embodiment, a housing 100 includes a cylindrical upper housing 101 and a lower housing 102 installed below the upper housing 101. The upper housing 101 is made of a transparent hyaline acrylate resin. A direction display portion 103 as an arrow indicating a right direction in the figure is formed in both front and back surface portions of the upper housing 101 along an axial direction thereof. The direction display portion 103 is in the arrow shape in the front and back surface portions to indicate the same direction.

In the upper housing 101, only the direction display portion 103 is transparent and colorless, while the other portion is colored, for example, with a fluorescent red color or the like. The fluorescent color portion is a little translucent and, when a light emitter described later is turned on, the upper housing 101 is illuminated in red.

Figure 2:
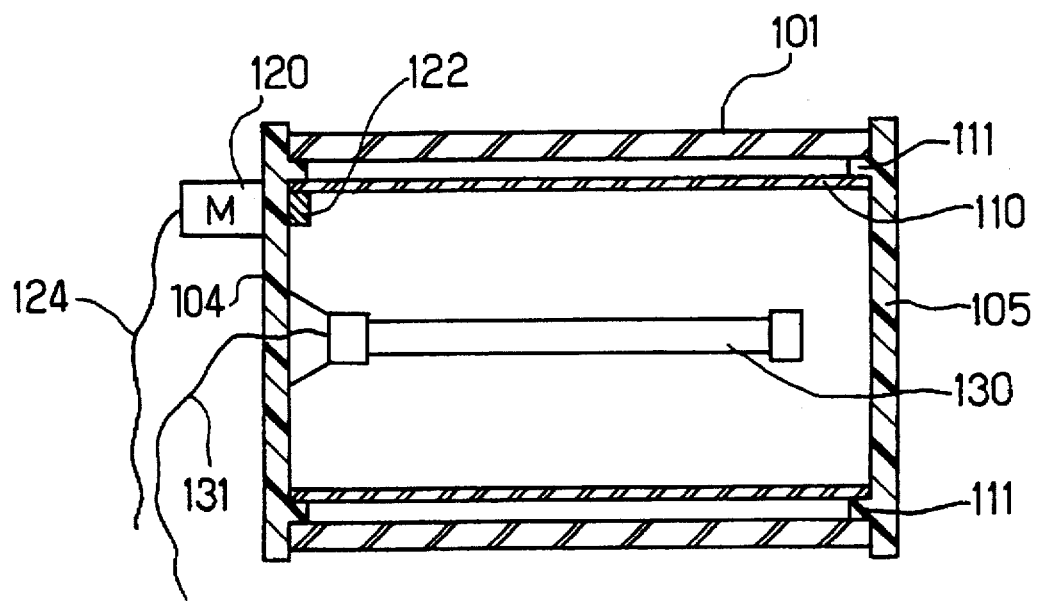
FIG. 2 is a sectional view illustrating an upper housing portion in FIG. 1.

As shown in FIG. 2, both circular end portions on left and right sides of the upper housing 101 are closed by resin side plates 104 and 105. Inside the upper housing 101, a rotation roller (rotation drum) 110 as a rotation member is disposed coaxially with the housing 101. The rotation roller 110 is disposed with a small clearance relative to an inner circumference of the upper housing 101 and held so as to rotate along the inner surface of the upper housing 101.

Moreover, in order to facilitate rotation of the rotation roller 110, between an outer circumference surface of the rotation roller 110 and the inner circumference surface of the upper housing 101, a cylindrical support portion 111 having a surface coated with a teflon material reducing sliding resistance to reduce friction is integrally formed on the side plates 104 and 105.

Figure 3:
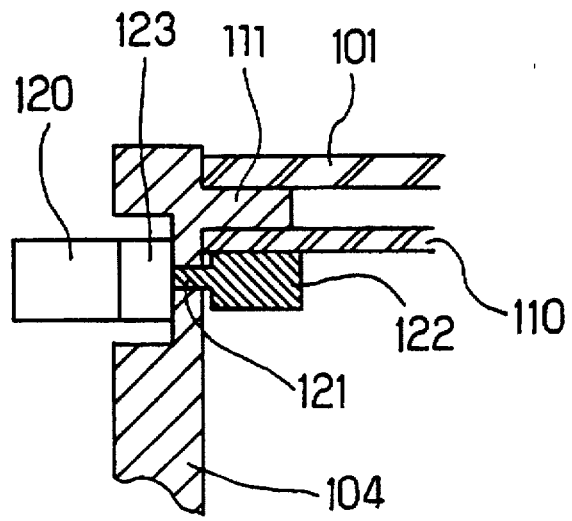
FIG. 3 is an enlarged sectional view illustrating a motor portion in FIG. 2.

On the side plate 104 at one side of the upper housing 101, an electric motor 120 having an output capacity of 1 W is mounted. As shown in FIG. 3, a drive shaft 121 of the motor 120 extends to the inside surface of the rotation roller 110 by penetrating the side plate 104. At a tip end of the drive shaft 121, a drive roller 122 is installed so as to rotate integrally therewith. The drive roller 122 is made of a material with high contact resistance such as urethane or the like. With the drive roller 122 contacting the inner surface of the rotation roller 110, rotation force of the motor 120 can be transmitted to the rotation roller 110. Furthermore, as shown in FIG. 3, between the motor 120 and the drive shaft 121, a reduction gear portion 123 is disposed so that rotation of the motor 120 is reduced to a designated rotation speed and is transmitted to the drive shaft 121.

Figure 4:
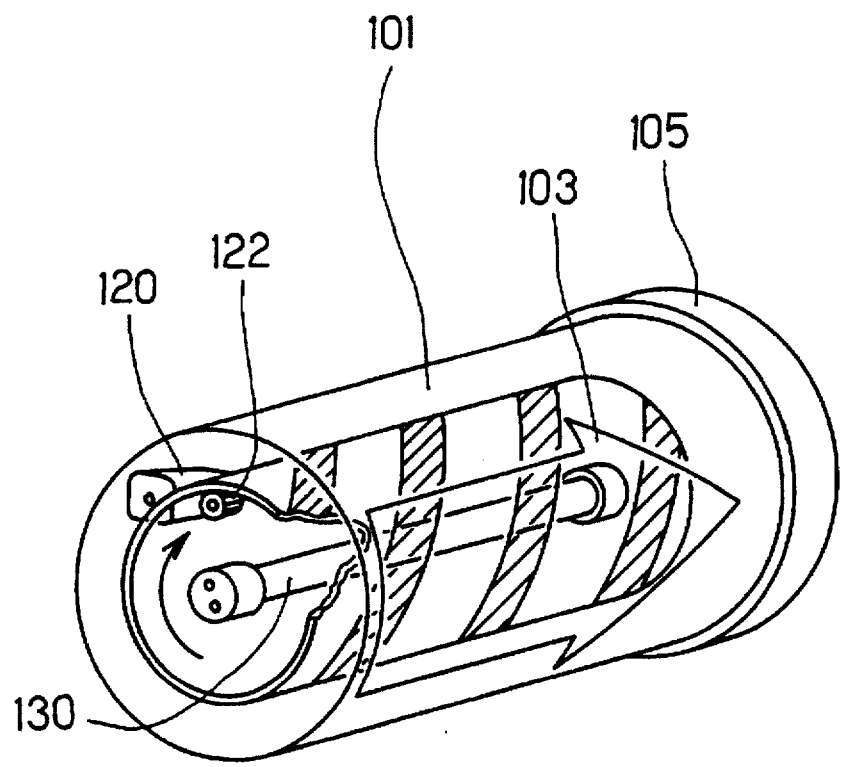
FIG. 4 is a perspective view illustrating the upper housing portion in FIG. 3.

As shown in FIGS. 2 and 4, substantially in a center portion of the rotation roller 110, a light emitter 130 is disposed. The emitter 130 is made of a cylindrical fluorescent light tube of 27 W output capacity and one end thereof is held by the side plate 104. An electric cord 131 supplying electric power to the emitter 130 extends to an outside of the side plate 104 and is connected to a battery (not shown in the figures) installed inside the lower housing 102. An electric cord 124 of the motor 120 is also connected to the battery inside the lower housing 102.

By opening and closing a switch 140 (refer to FIG. 1) installed on the lower housing 102, the operations of the motor 120 and the emitter 130 are changed as is known well in the art. A fixed metallic foot portion 150 is fixed at the lower housing 102. By the foot portion 150, the housing 100 may be stably set up on a ground surface such as a road or the like. The fixed foot portion 150 is detachably fitted to the lower housing 102.

Figure 5:
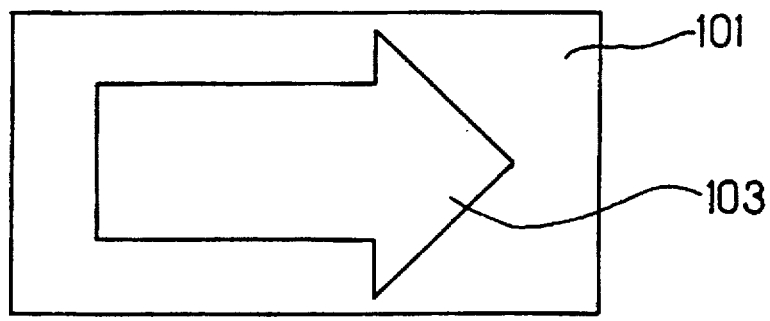
FIG. 5 is a front view illustrating the upper housing itself in FIG. 1.

In FIG. 5, the direction display portion 103 remains transparent and colorless and the other portion is coated in red fluorescent color.

Figure 6:
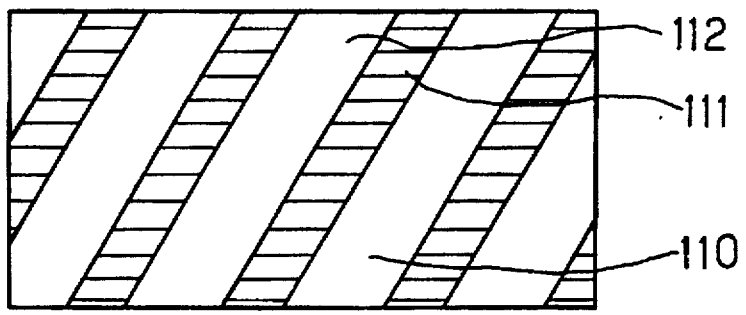
FIG. 6 is a front view illustrating a built-in rotation roller in FIG. 1.

As shown in FIG. 6, the rotation roller 110 is made of a transparent hyaline resin such as acrylate or polycarbonate and blue-colored inclined stripes are coated or painted thereon to form transparent blue portions 111 and transparent white portions 112. Therefore, in the rotation roller 110, contrast of the inclined stripes by the white portions 112 and the blue portions 111 is made clear. The direction display device described above may be held in an automotive trunk. In this case, the foot portion 150 may be detached from the lower housing 102 and may be held in the automotive trunk so that the display device may be stored in a limited space.

At a car accident site or a road construction site, when a direction display is necessary for changing the flow of traffic on a road, the foot portion 150 is fitted to the lower housing 102 and the direction display device is set up on the road. While using the direction display device, when the switch 140 is turned on, electric power is supplied to the emitter 130 and the motor 120 from the battery not shown in the figure.

Therefore, the light from the emitter passes outside through the rotation roller 110 and the direction display portion 103. Thus, the direction display portion 103 formed on the housing 100 can be recognized easily by the car drivers from a distance. Further, by rotation of the motor 120, since the rotation roller 110 rotates through the reduction gear 123, the drive shaft 121 and the drive roller 122, stripes 111 and 112 of the rotation roller 110 look like they move from left to right in the direction display portion 103 in the figures. By matching an arrow direction of the direction display portion 103 with the movement direction, the direction indicated by the direction display portion 103 can be recognized even from afar. Since when the rotation roller 110 rotates too fast, an ability of direction indication by the inclined stripes is lowered, rotation of the drive shaft 121 is controlled by the reduction gear 123 so that one rotation is completed in every five seconds to maintain an acceptable speed.

(Second Embodiment)

Figure 7:
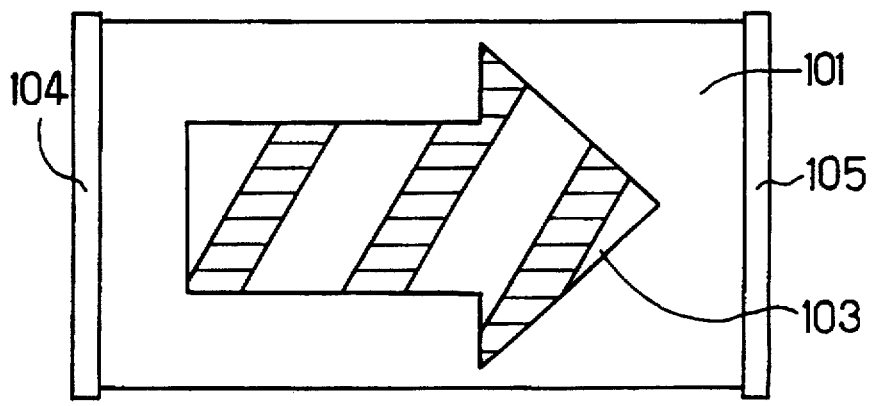
FIG. 7 is a front view illustrating the upper housing portion with the built-in rotation roller.
Figure 8:
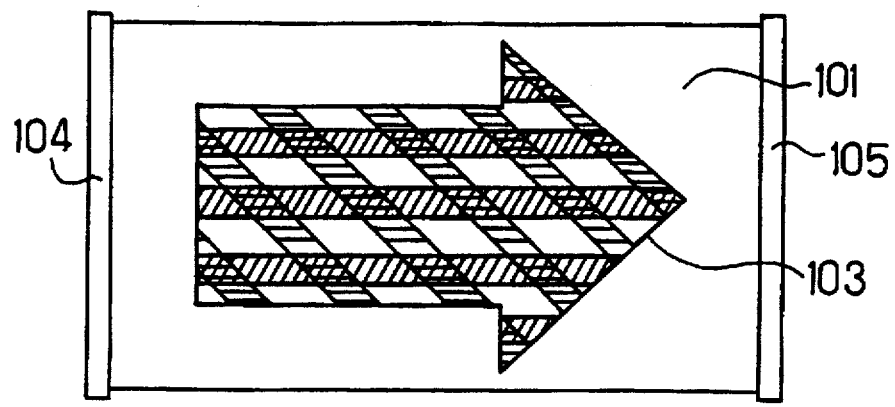
FIG. 8 is a front view illustrating an upper housing portion according to a second embodiment of the present invention.
Figure 9:
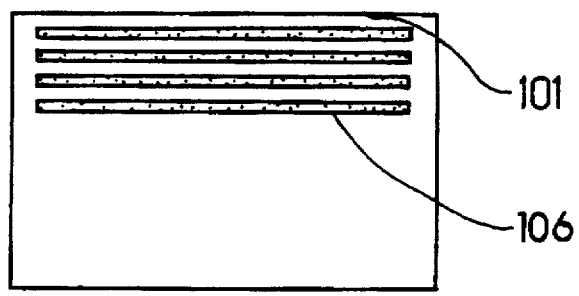
FIG. 9 is an exploded view illustrating stripes in an inner surface of the upper housing in FIG. 8.

In the first embodiment as described above, as shown in FIGS. 1 through 7, the inclined stripes of the blue portion 111 and the white portion 112 move in the direction display portion 103. However, as shown in FIG. 8, a moire fringe pattern comprising a plurality of crossing stripes can be used. As shown in FIG. 9, the moire fringe pattern can be formed in such a way that a long sideways translucent stripe 106 is provided inside the upper housing 101 and is positioned inside the direction display portion 103. The direction display portion 103 in an arrow form is omitted in FIG. 9.

Figure 10:
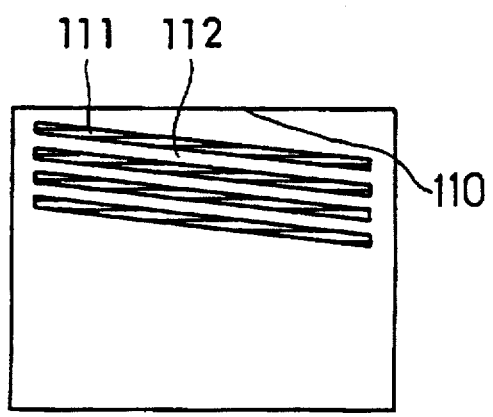
FIG. 10 is an exploded view illustrating stripes of the rotation roller in FIG. 8.

The blue portions 111 and the white portions 112 of inclined stripes of the rotation roller 110 are directed as shown in FIG. 10. By combining the long sideways stripes 106 shown in FIG. 9 and inclined stripes of the rotation roller 110 shown in FIG. 10, the moire fringe pattern shown in FIG. 8 can be made.

(Third Embodiment)

In the first and second embodiments, the emitter 130 is disposed inside the rotation roller 110. As long as the emitter 130 is disposed in the housing 100, however, it does not have to be disposed inside the roller 110. In a third embodiment shown in FIG. 11, the emitter (fluorescent light tube) 130 is installed in the lower housing 102 outside the rotation roller 110. Thus, the rotation roller 110 is illuminated from below by the light from the emitter 130.

Figure 11:
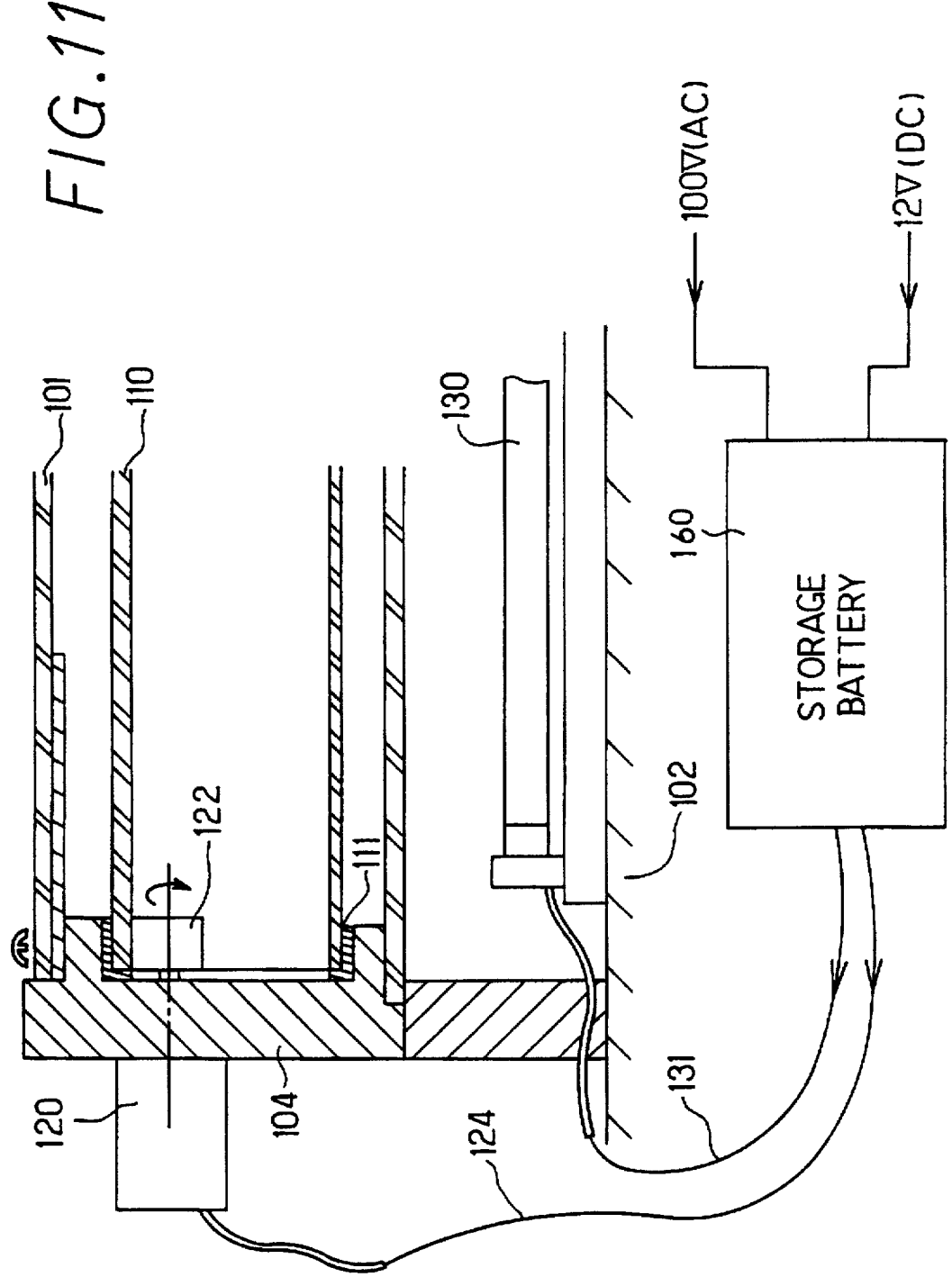
FIG. 11 is a sectional view illustrating a third embodiment according to the present invention.

As shown in FIG. 11, a storage battery 160 is used as a power source. The storage battery 160 can be charged by a commercial alternating current power source of 100V or an automotive direct current power source of 12V. Voltage from the storage battery 160 is supplied to the emitter 130 and the motor 120 through the cords 131 and 124, respectively.

Therefore, when a time period of use of the direction display on the road is long as at a road construction site, the fluorescent light tube 130 and the motor 120 can be used for a long time by receiving a voltage supply from the alternating current power source of 100V.

Further, although only one switch 140 is installed in the above-described embodiment to control the fluorescent light tube 130 and the motor 120, the switch 140 can be divided into two sections to control the fluorescent light tube 130 and the motor 120 independently.

Moreover, although only one fluorescent light tube of about 27 W is used as the emitter 130, two or more fluorescent light tubes can be used. Also, other types of light tubes or bulbs can be used instead of the fluorescent light tube. Although the emitter 130 is provided, the emitter 130 may be omitted in such cases as, for example, there are only a few times where the device is used at night. Furthermore, by forming the inclined stripes of the rotation roller 110 with a reflection material so that the light from an automotive head light can be reflected, a certain degree of visibility can be obtained even at night without the emitter 130.

(Fourth Embodiment)

The fourth embodiment is shown in FIGS. 12 through 21. In the embodiment, the device is constructed so that the arrow direction of the direction display portion 103 is changeable to indicate right or left directions. In addition, by changing the rotation direction of the motor 120, the movement direction of the inclined stripes of the rotation roller can be changed to indicate left or right directions.

Figure 12:
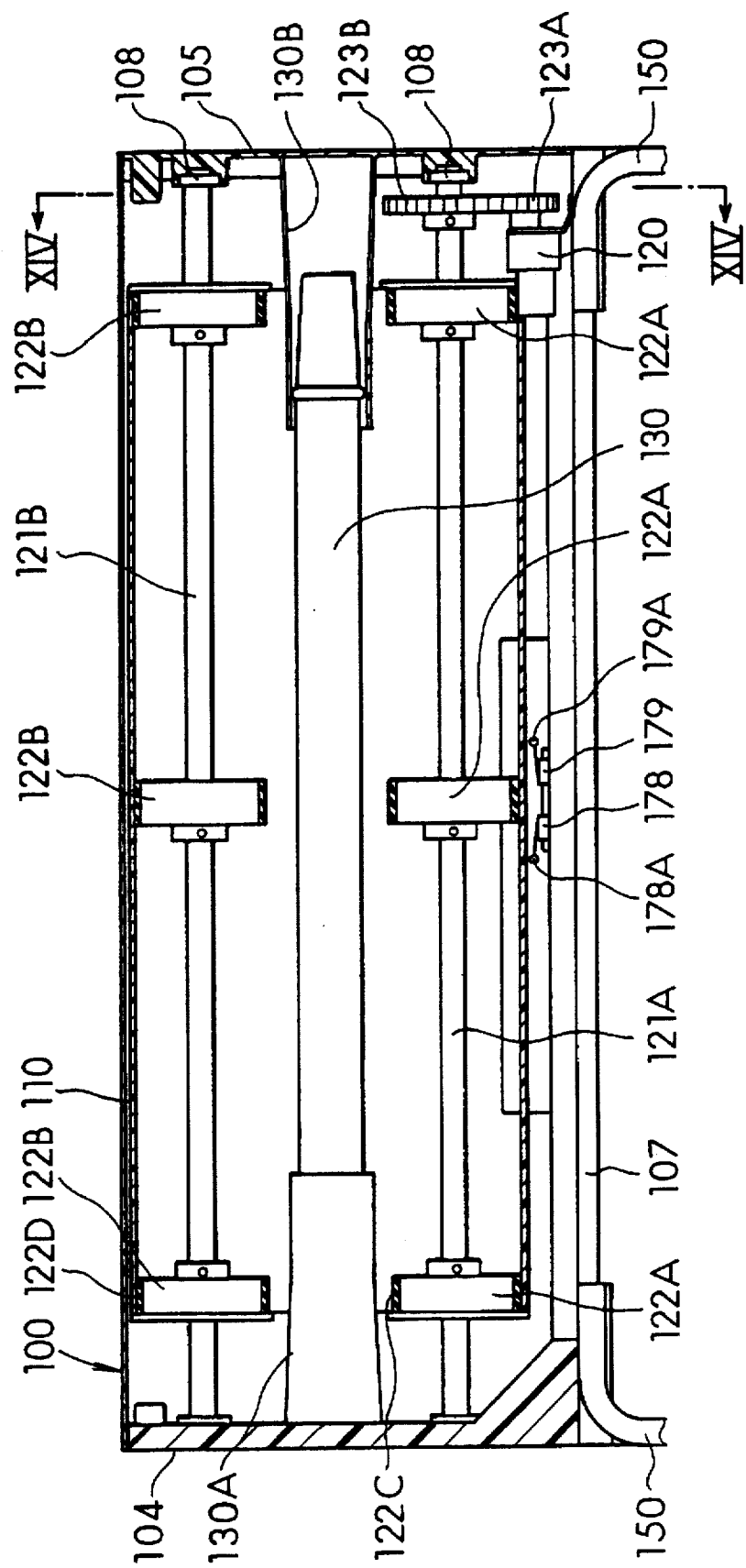
FIG. 12 is a front sectional view illustrating a fourth embodiment according to the present invention.
Figure 13:
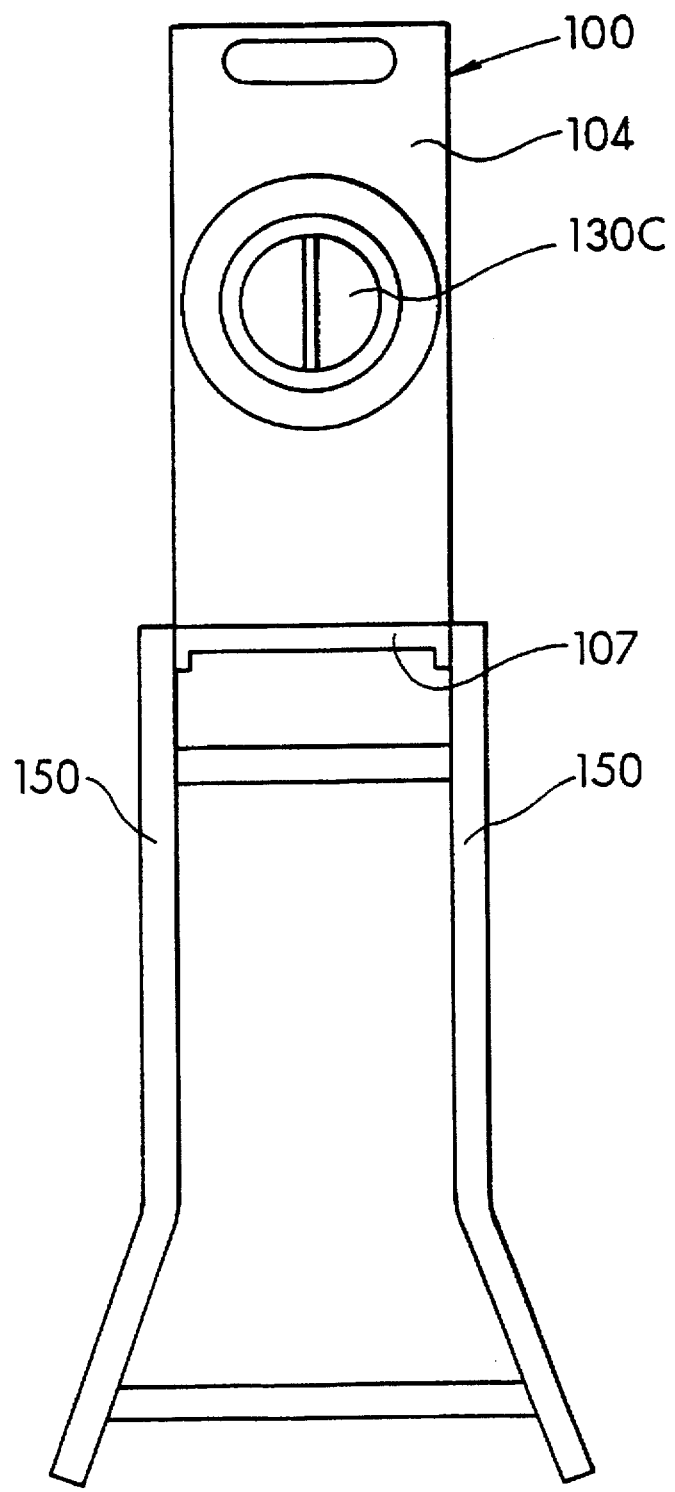
FIG. 13 is a left side view of FIG. 12.
Figure 15:
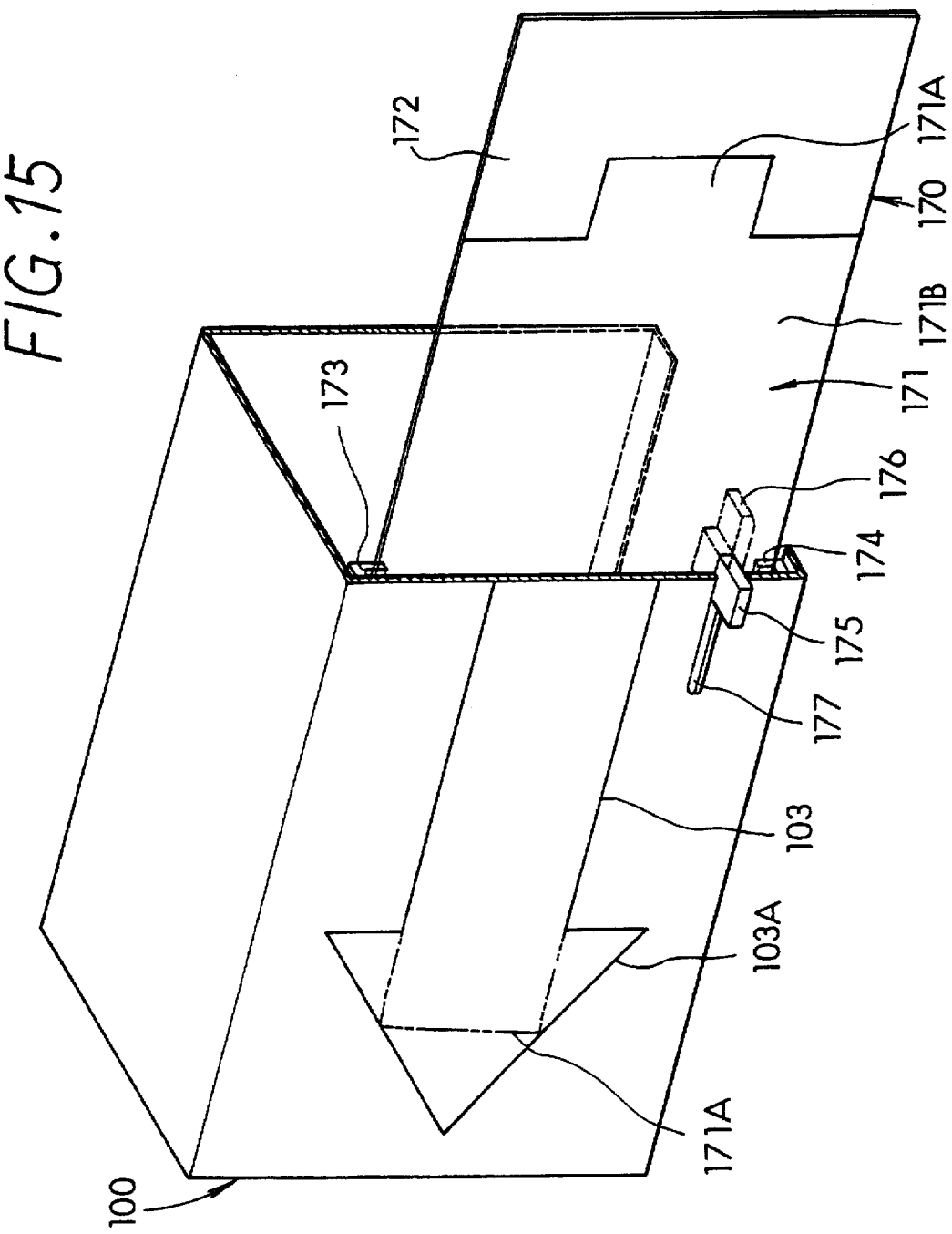
FIG. 15 is a perspective view illustrating a main portion of the fourth embodiment.

As shown in FIG. 15, the housing 100 in the embodiment is made of resin in the form of a long parallelepiped. A bottom portion of the housing 100 is open to be held by and fixed to a resin or metallic substrate 107 (FIG. 13). The housing 100 is cut around a center portion in the left and right directions and only the left side portion thereof is shown in the figure. The housing 100 and the substrate 107 can be set up on the ground surface of the road or the like by the metallic (iron) foot portion 150 (FIG. 12) disposed on both the left and right end portions. As shown in FIG. 12, two resin rotation shafts 121A and 121B are disposed so as to extend in a horizontal direction. The two rotation shafts 121A and 121B are disposed in parallel so that one is above the other. Further, both end portions are supported rotatably by the side plates 104 and 105 with bearings 108.

Three drive rollers 122A and 122B are fixed to the rotation shafts 121A and 121B, respectively, to rotate integrally therewith. On an outer circumference side of the drive rollers 122A and 122B, rubber members 122C and 122D for increasing friction force are adhered.

The rotation roller (rotation member) 110 is disposed on the outer circumference side of the drive rollers 122A and 122B so as to have an elliptic section extended in the up-and-down direction. Since the rotation roller 110 is assembled so as to be pressure fitted on the outer circumference surface of the drive rollers 122A and 122B, the rotation roller 110 is rotated and driven by rotation thereof. Just like the above-described embodiment, the rotation roller 110 made of the translucent resin has inclined stripes having blue portions 111 and white portions 112.

Figure 14:
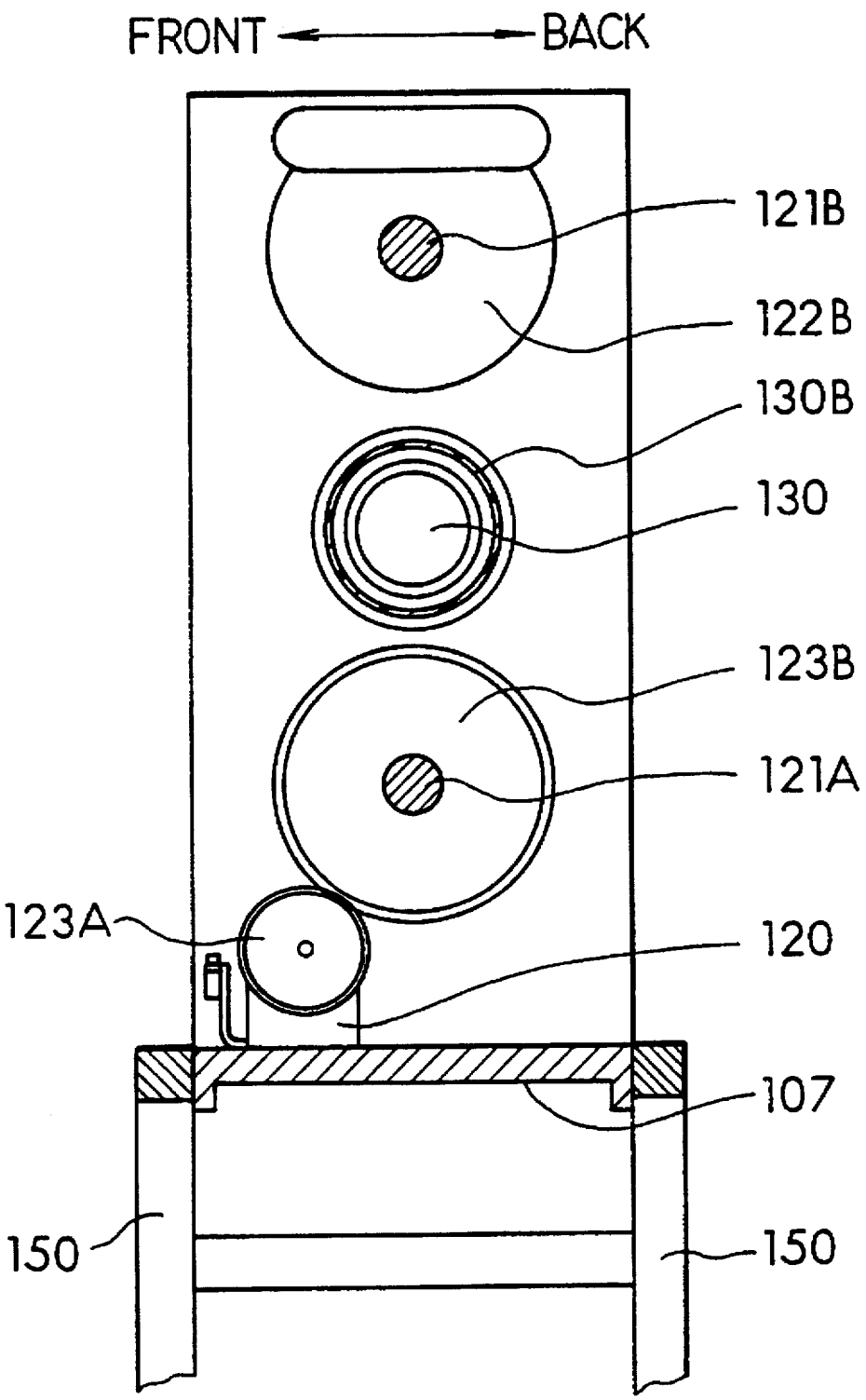
FIG. 14 is a sectional view taken along the line XIV—XIV in FIG. 12.

As shown in FIG. 14, the motor 120 is disposed in the top surface of the front surface side of the substrate 107. The rotation of the motor 120 is transmitted to the rotation shaft 121A in a lower side through reduction gears 123A and 123B to rotate the rotation shaft 121A.

The light emitter 130 made of a fluorescent light tube is disposed around the middle portion between the rotation shafts 121A and 121B in the inner side of the rotation roller 110. Both ends of the emitter 130 are held by generally cylindrical support tubes 130A and 130B formed on the side plates 104 and 105 at the left and the right sides of the housing 100. Further, on the left side of the side plate 104, a lid member 130C (FIG. 13) is detachably installed at a position where the emitter 130 is supported. By removing the lid member 130C, the emitter 130 can be easily exchanged.

Figure 16:
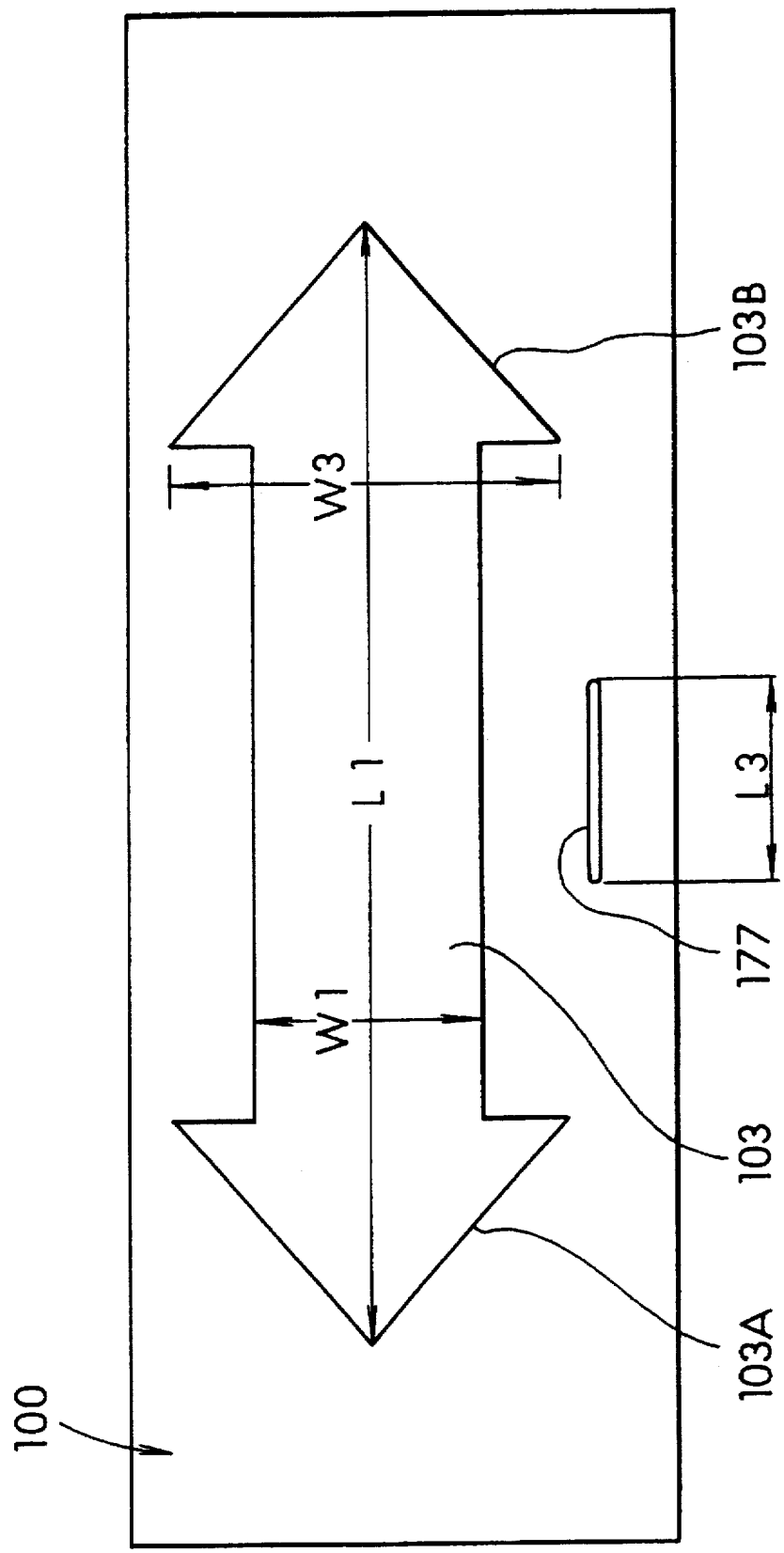
FIG. 16 is a front view illustrating the housing in the fourth embodiment.

As shown in FIGS. 15 and 16, the transparent hyaline direction display portion 103 is formed on the front surface of the housing 100. At both end portions of the direction display portion 103, arrow portions 103A and 103B each indicating a left and right direction respectively are formed. Inside the front surface of the housing 100, in a longitudinal direction (left and right direction) of the direction display portion 103 of the housing 100, a movable plate member 170 is slidably installed. Thus, the plate member 170 has an arrow switching function of the direction display portion 103 and is made of translucent material in the form of a longitudinal rectangle.

Figure 17:
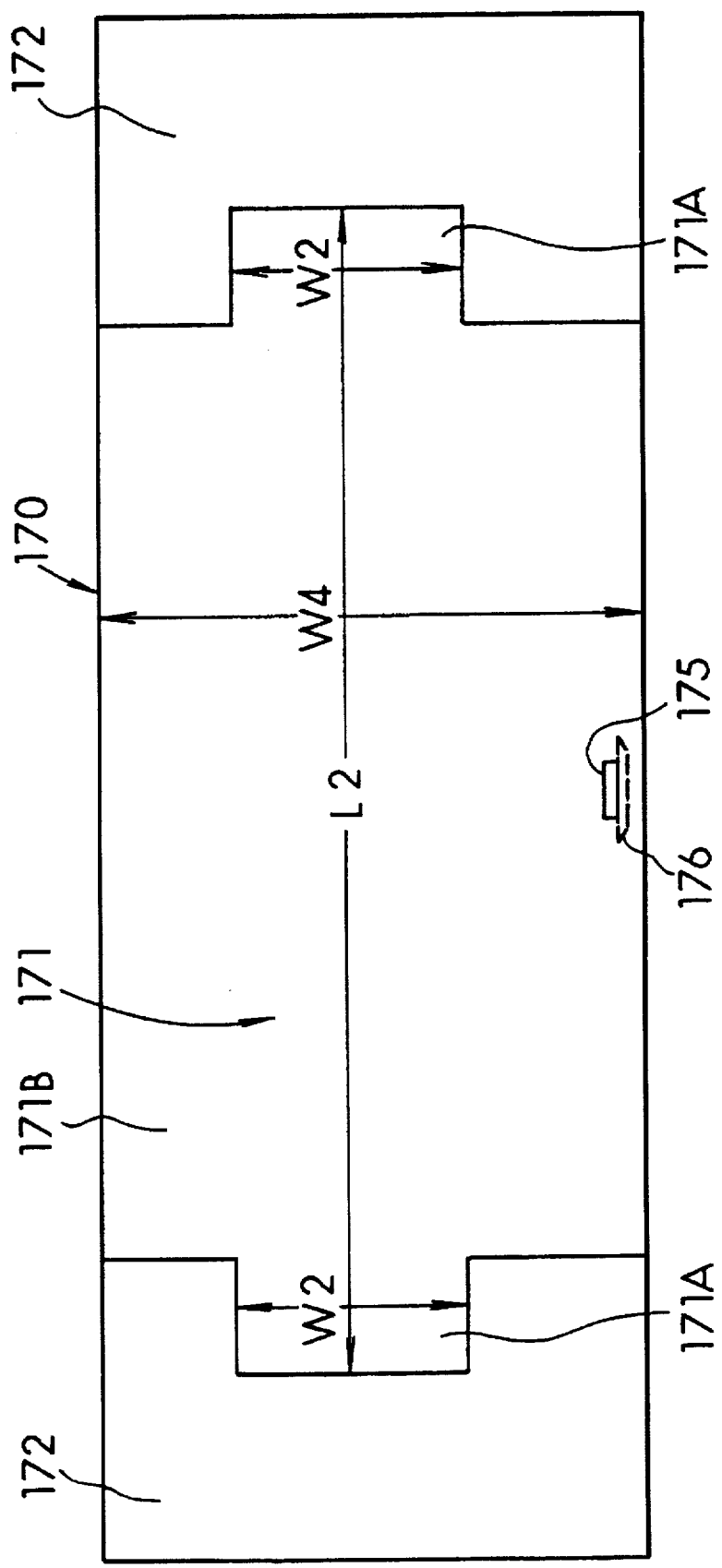
FIG. 17 is a front view illustrating a plate-shaped member for changing arrows in the fourth embodiment.

As shown in FIG. 17, the plate member 170 has a translucent transmission window 171 at the center portion in the left and right direction. An arrow-shaped changing portion 172 coated in the same color (that is, in red) as the peripheral portion of the direction display portion 103 is formed around left and right end portions of the transmission window 171. The transmission window 171 is used to pass the inclined stripe portions (111 and 112) of the rotation roller 110 through the direction display portion 103. Thus, the transmission window 171 is set to a length L2 almost the same as a length L1 of the direction display portion 103. Further, at both end portions of the transmission window 171, a small width portion 171A set to a width W2 which is the same as a width W1 of the direction display portion 103 is formed. In the middle of the small width portion 171A, a large width portion 171B set to a width W4 larger than a width W3 of the arrow portions 103A and 103B of the direction display portion 103 is formed.

Figure 18:
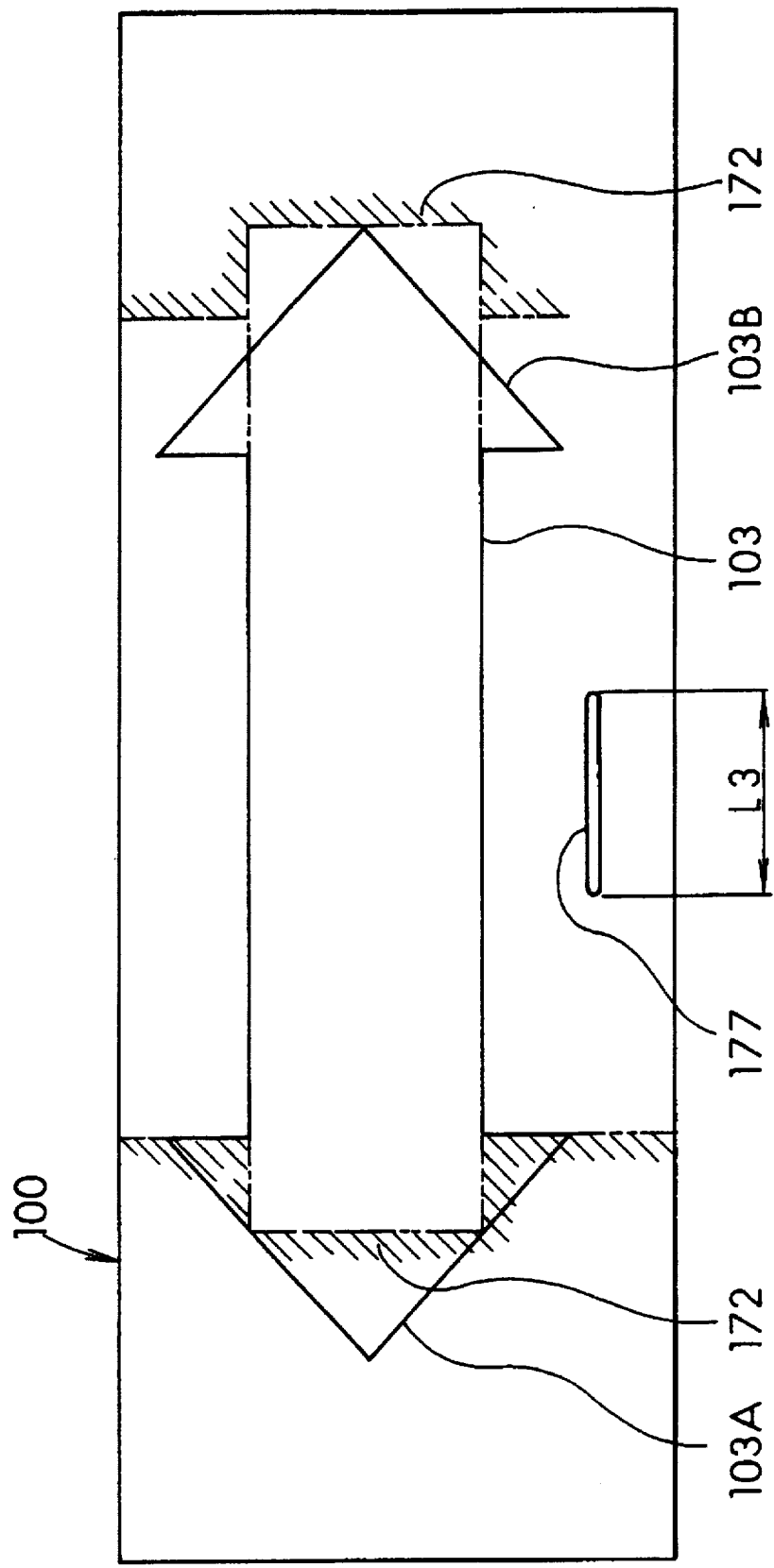
FIG. 18 is an explanatory view illustrating an operation of the plate-shaped member for changing arrow direction in the fourth embodiment.

In FIG. 18, a dot chain line with hatching indicates a movement position of the arrow-shaped changing portion 172 of the plate member 170 against the direction display portion 103 of the housing 100. Of the two arrow-shaped changing portions 172 at the right and left sides, one side (left side) of the arrow-shaped changing portion 172 overlaps with a triangle-shaped portion of the left arrow portion 103A of the direction display portion 103, and therefore, a shape of the arrow portion 103A cannot be recognized. At this time, the arrow-shaped changing portion 172 at the other side (right side) is positioned around the side portion (outside portion) of the arrow portion 103B in the right side of the direction display portion 103. Therefore, the arrow portion 103B directed to the right can be recognized.

Next, an assembly construction of the plate member 170 inside the housing 100 is explained. At the top corner portion and the bottom corner portion of the inside surface of the front surface of the housing 100, guide rails 173 and 174 (see FIG. 15) are installed. By fitting the top end portion and the bottom end portion of the plate member 170 slidably into the guide rails 173 and 174, the plate member 170 can move in the left and right direction inside the front surface of the housing 100.

Figure 19:
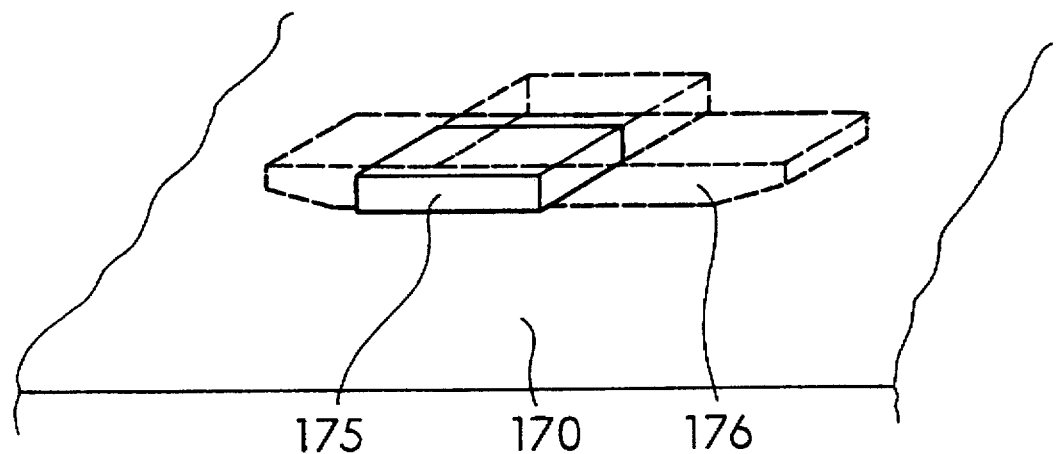
FIG. 19 is a perspective view illustrating a holding portion of the plate-shaped member for changing arrow direction in the fourth embodiment.
Figure 20:
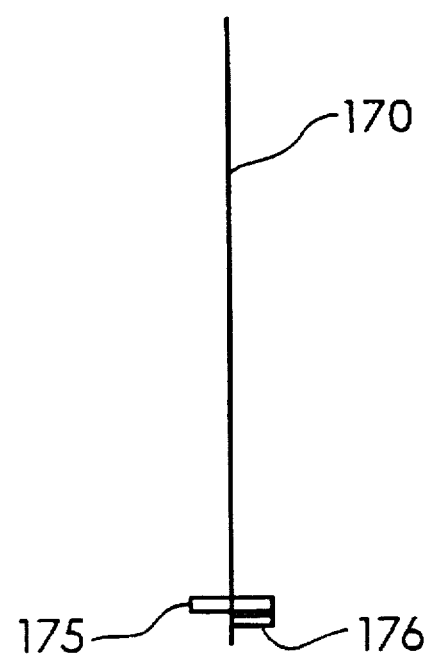
FIG. 20 is a side view illustrating the plate-shaped member for changing arrow direction in the fourth embodiment.

On the bottom portion of the longitudinal center portion of the plate member 170, a holding portion 175 for actuating manually the plate member 170 is integrally made using resin. The holding portion 175, as shown in FIGS. 19 and 20, is formed so as to extend from a front surface to a back surface side of the plate member 170. Under the bottom side of the protrusion of which the holding portion 175 extending toward the back surface side, a switch drive member 176 having a wider width (i.e., a wider dimension in the left and right direction) than the holding portion 175 is fixed by adhesive or the like.

The switch drive member 176 is formed into a ship-shaped section having a reduced thickness at both left and right end portions. The switch drive member 176 drives a limit switch for changing the rotation of the motor described later.

On the front surface of the housing 100, at the center portion of the bottom portion of the direction display portion 103, a long sideways slit 177 is formed laterally. The holding portion 175 is inserted slidably into the slit 177. Further, the holding portion 175 projects to an outer portion of the housing 100 through the slit 177 and the plate portion 170 can move in the left and right directions by moving the holding portion 175 by hand from the outside of the housing 100. When the holding portion 175 contacts the lateral end portion of the long sideways slit 177, movement of the holding portion 175, that is, movement of the plate member 170 is restricted. Therefore, the slit 177 plays a role of a stopper portion restricting an amount of movement of the holding portion 175.

Thus, as shown in FIG. 18, a length L3 of the slit 177 is set to a length satisfying the following condition. When the holding portion 175 contacts the left (right) end portion of the slit 177 and the movement of the holding portion 175 is restricted, by one of the arrow-shaped changing portions 172 of the plate member 170, the shape of one arrow portion 103A (103B) of the direction display portion 103 cannot be recognized. Moreover, by another arrow-shaped changing portion 172, the shape of another arrow portion 103B (103A) of the direction display portion 103 can be recognized.

Inside the front surface of the housing 100, at a downward portion of the slit 177, two limit switches 178 and 179 (FIG. 12) are installed. From the top surfaces of the limit switches 178 and 179, switch operation pieces 178A and 179A extend in an opposite direction and are arranged so as to be displaced in an up-and-down direction. When the holding portion 175 contacts the left or right end portion of the slit 177, one of the limit switches 178 and 179 is closed by pressing the corresponding one of switch operation pieces 178A and 179A downward with the switch drive member 176.

Figure 21:
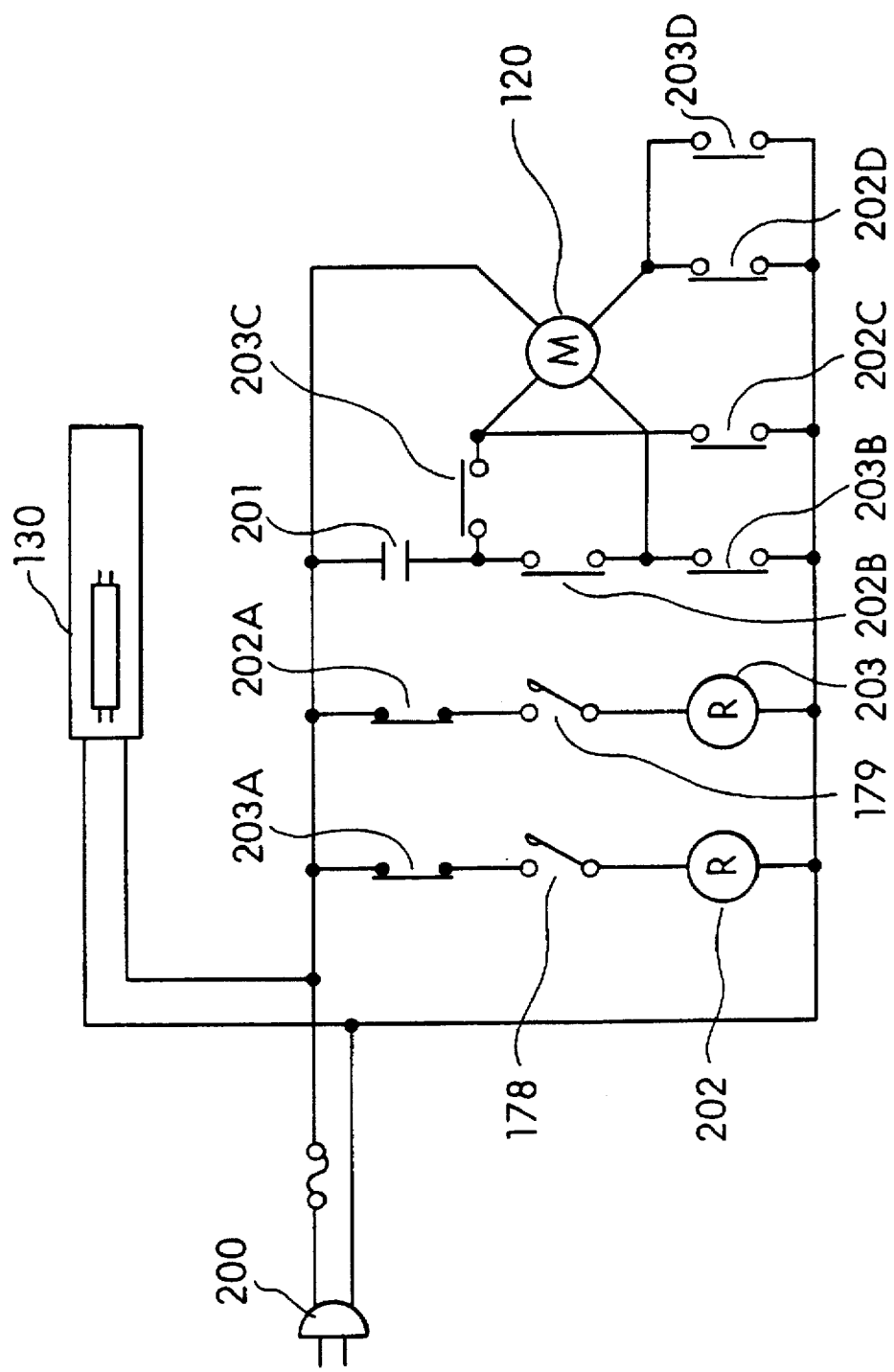
FIG. 21 is an electric wiring diagram illustrating a structure of an electric circuit portion in the fourth embodiment.

In FIG. 21, a power source plug 200 is connectable to a power source socket of 100V commercial alternating current power. The emitter 130, the fluorescent light tube, is driven by the alternating current power source supplied through the plug 200. The motor 120 comprises an induction motor. By changing the phase of a field current of the motor using a condenser 201, a rotation direction of the motor can be changed.

Relays 202 and 203 controlled by the limit switches 178 and 179 are provided. Using relay contacts 202A through 202D opened and closed by the relay 202 and relay contacts 203A through 203D opened and closed by the relay 203, a circuit of the induction motor 120 and the condenser 201 is switched and the motor rotation direction is switched.

Next, an operation of the fourth embodiment is explained. In an electric circuit in FIG. 21, the power source plug 200 is connected to the power source socket of 100V commercial alternating current power. Thus, the alternating current power source of 100V is supplied to the circuit in FIG. 21. In this condition, the holding portion 175 of the plate member 170 is positioned so as to contact the right end portion of the slit 177. Since the arrow-shaped changing portion 172 of the plate member 170 reaches a position shown in FIG. 18, the right side of the arrow-shaped changing portion 172 is positioned at a right side from the arrow portion 103B in the right side of the direction display portion 103. Therefore, the right side of the arrow portion 103B can be recognized since the arrow-shaped changing portion 172 is not superimposed on the right side of the arrow shape of the arrow portion 103B.

On the other hand, the left side of the arrow-shaped changing portion 172 is superimposed or overlapped on the left side of the arrow portion 103A of the direction display portion 103. In addition, the arrow-shaped changing portion 172 is given the same red color as the periphery portion of the direction display portion 103. Therefore, the left side of the arrow portion 103A can be recognized as if the arrow shape has disappeared. Thus, in this case, the direction display portion 103 is in the form of the arrow pointing right, in the same manner as shown in FIG. 7.

The holding portion 175 of the plate member 170 contacts the right end portion of the slit 177. At the same time, the switch drive member 176 adhered to the bottom surface of the holding portion 175 presses the switch operation piece 179A of the right side of the limit switch 179 to close the limit switch 179. Thus, open and close condition of the relay contacts 203A through 203D of the relay 203 controlled by the limit switch 179 is reversed. The motor 120 rotates the rotation roller 110 so that the inclined stripes 111 and 112 move in the right direction as explained with reference to FIG. 7.

Similarly, when the holding portion 175 of the plate member 170 is positioned so as to contact the left end portion of the slit 177, the arrow-shaped changing portion 172 of the plate member 170 reaches a position opposite to the position shown in FIG. 18 (i.s., the left side), the left side of the arrow-shaped changing portion 172 is positioned at the left side of the arrow portion 103A of the direction display portion 103. Thus, the left side of the arrow portion 103A can be recognized since the left side of the arrow-shaped changing portion 172 is not superimposed on the arrow shape of the arrow portion 103A.

On the other hand, since the right side of the arrow-shaped changing portion 172 is superimposed on the right side of the arrow portion 103B of the direction display portion 103, the right side arrow portion 103B can be recognized from a distance as if the arrow shape has disappeared. Therefore, in this case, the direction display portion 103 is in the form of the arrow shape directing left in which the arrow indicates the opposite to the direction shown in FIG. 7. At this time, the switch drive member 176 presses the switch operation piece 178A of the left side of the limit switch 178 and the limit switch 178 is closed. Therefore, the open and closed condition of the relay contacts 202A through 202D of the relay 202 controlled by the limit switch 178 is reversed. The motor 120 rotates the rotation roller 110 in a direction in which the inclined stripes 111 and 112 move in the left direction.

In the direction display device according to the fourth embodiment, with a simple hand operation such as only moving the holding portion 175 of the plate member 170 to the right or the left, the direction display in the right or left direction, respectively, can be carried out assuredly.

Figure 22:
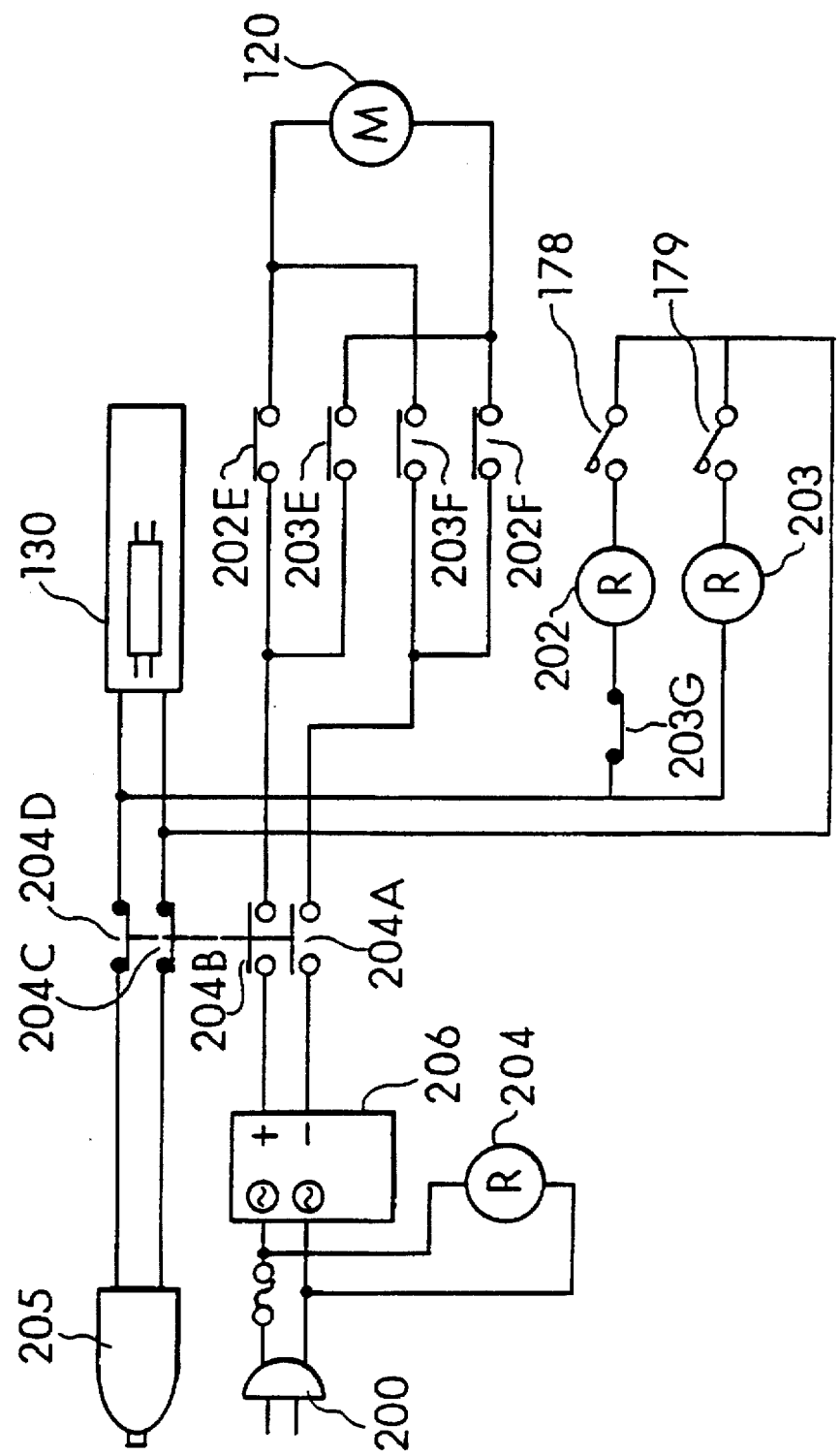
FIG. 22 is an electric wiring diagram illustrating a fifth embodiment according to the present invention.

A fifth embodiment relates to a modification of the electric circuit in which the alternating current power source and the direct current power source are switched. As shown in FIG. 22, other than the alternating current power source plug 200, a direct current power source plug 205 is connected to the circuit. The direct current plug 205 is used to receive supply of direct current voltage from the direct current power source of 12V such as an automotive battery through a cigarette lighter (not shown).

The light emitter 130 includes the fluorescent light tube having a built-in circuit converting the direct current voltage of 12V into the alternating current voltage of 100V. Thus, the light emitter 130 is turned on with either the direct current voltage of 12V or alternating current voltage of 100V to emit the light. The motor 120 is a direct current motor and by reversing an application direction of the direct current, the rotation direction is also reversed.

An alternating current to direct current conversion circuit 206 is connected to convert the alternating current voltage of 100V into the direct current voltage of 12V. The relay 204 is used to switch a power supply circuit for the motor 120 to an output side of the alternating current and direct current conversion circuit 206 at the time of use the alternating current of 100V. The limit switches 178 and 179 are the same as the ones in the fourth embodiment. The relays 202 and 203 are operated by the operations of the limit switches 178 and 179 and by opening and closing the relay contacts 202E, 202F, 203E, 203F and 203G, the direction of the application of the direct current voltage to the motor 120 is reversed to change the direction of the rotation of the motor 120.

According to the direction display device of the present invention, by rotating the rotation roller provided with the inclined stripes by the motor, the stripes move inside the direction display portion formed in the housing as if the stripes move toward one direction. As a result, in addition to the arrow display of the direction display portion, the same direction as the arrow direction is indicated by movement of the stripes. Therefore, visibility of the indicated direction is extremely good from afar.

Further, the direction display portion of the housing has two arrow portions indicating the opposite directions from each other at both end portions. With the movable arrow-shaped changing structure against the housing, either one of the two directions can be recognized from the outside. With the switch structure responsive to the switching operation of the arrow portion by the arrow-shaped changing structure, the rotation direction of the motor is switched. Further, in the arrow switching mechanism, a hand operation member is provided and by manually operating the hand operation member, switching the arrow portion and switching the rotation direction of the motor by the switch mechanism are carried out simultaneously. Therefore, with the single direction display device, direction indication in both right and left directions can be carried out assuredly by the simple hand operation.

It is to be understood that the direction display portion 103 and the transmission window 171 may be found on the arrow-shaped changing portion 172 and the housing 100, respectively.

The present invention having been described should not be limited to the disclosed embodiments, but it may be modified in many other ways without departing from the scope and the spirit of the invention.

What is claimed is:

1. A direction display device comprising:

a housing having a direction display portion having translucency in at least one portion thereof, said direction display portion of said housing having two arrow portions directed to opposite directions at both end portions thereof;

an arrow shape switching mechanism movably installed in said housing so that one of said arrow portions of said direction display portion can be recognized from outside and the other of said arrow portions cannot be recognized;

a hand operation member moving said arrow shape switching mechanism for operating said arrow shape switching mechanism by hand; and a switch mechanism operatively coupled with said arrow shape switching mechanism for switching rotation direction of said motor;

a rotation member forming inclined stripes thereon and installed rotatably in said housing;

a motor coupled with said rotation member to rotate said rotation member so that said inclined strips move in a direction indicated by said direction display portion and recognized through said direction display portion.

2. The direction display device according to claim 1, further comprising:

a light emitter installed inside said housing and producing light to an outside through said direction display portion.

3. The direction display device according to claim 2, wherein said rotation member is formed into a cylindrical shape and installed inside said housing.

4. The direction display device according to claim 2, wherein said emitter is installed outside said rotation member.

5. The direction display device according to claim 1, further comprising:

a battery installed in said housing for supplying electric power to said motor.

6. The direction display device according to claim 1, wherein said direction display portion is formed at a front surface side and at a back surface side of said housing to indicate the same direction.

7. The direction display device according to claim 1, wherein said housing is colorless and translucent at said direction display portion and colored and translucent at the other portion than said direction display portion.

8. The direction display device according to claim 1, wherein translucent stripes are formed in said direction display portion of said housing.

9. The direction display device according to claim 1, further comprising:

a stopper portion forward in said housing for restricting amount of operation of said hand operation member, so that, by contacting said hand operation member to said stopper portion, switching said arrow portions and switching said rotation direction of said motor by said switch mechanism can be carried out simultaneously.

10. The direction display device according to claim 1, wherein:

said arrow switching mechanism includes a movable plate member positioned inside said direction display portion of said housing in a longitudinal direction of said direction display portion;

said plate member includes a transmission window having a length corresponding to said direction display portion and passing inclined stripes portion of said rotation member therethrough to said direction display portion;

said plate member further includes an arrow changing portion positioning on the periphery of both end portions of said transmission window and formed with the same color as the periphery portion of said direction display portion of said housing, and said arrow changing portion at the other end side of said transmission window is positioned in said arrow portion at the other side of said direction display portion, when said arrow changing portion in one end side of said transmission window is superimposed on an arrow portion in one end side of said direction display portion so that a shape of said arrow portion cannot be recognized, so that said arrow portion at the other end side of said direction display portion can be recognized.

11. The direction display device according to claim 1, further comprising:

a reduction gear mechanism decelerating rotation of said motor;

a rotation shaft rotatably disposed in an inner circumference side of said rotation member and connected to an output side of said reduction gear mechanism; and a roller integrated with said rotation shaft and pressed to an inner circumference surface of said rotation member for rotating said rotation member.

12. A direction display device comprising:

first panel member formed with a pair of arrows directed to opposite directions and colored around said arrows;

a rotation member rotatably positioned inside said first panel member and having inclined stripes thereon to be recognized through said arrows;

an electric drive mechanism for rotating said rotation member so that said inclined stripes can be recognized as moving in said arrows;

second panel member positioned adjacent to said first panel member and having a portion colored in the same color as around said arrows in said first panel member, said colored portion being aligned from one to the other of said arrows when one of said first panel member and said second panel member is relatively moved from one position to the other position; and a switching mechanism operatively coupled with one of said panel members for reversing a rotation direction of said rotation member in response to relative movement between said first panel member and said second panel member.

13. A direction display device comprising:

display means formed with an arrow mark in a transparent condition for indicating a direction;

rotation means installed behind said display means and formed with inclined stripes;

motor means coupled with said rotation means for rotating said rotation means so that said inclined stripes are recognized as moving through said arrow mark; and reversing means operatively coupled with said display means and said motor means for reversing concurrently the direction indicated by said arrow mark and a direction of rotation of said motor means.

14. A direction display device according to claim 13, wherein:

said arrow mark includes two arrows pointing opposite directions from each other; and said reversing means includes switching means for switching selection of one of said two arrows.

* * * * *